Figure 1:
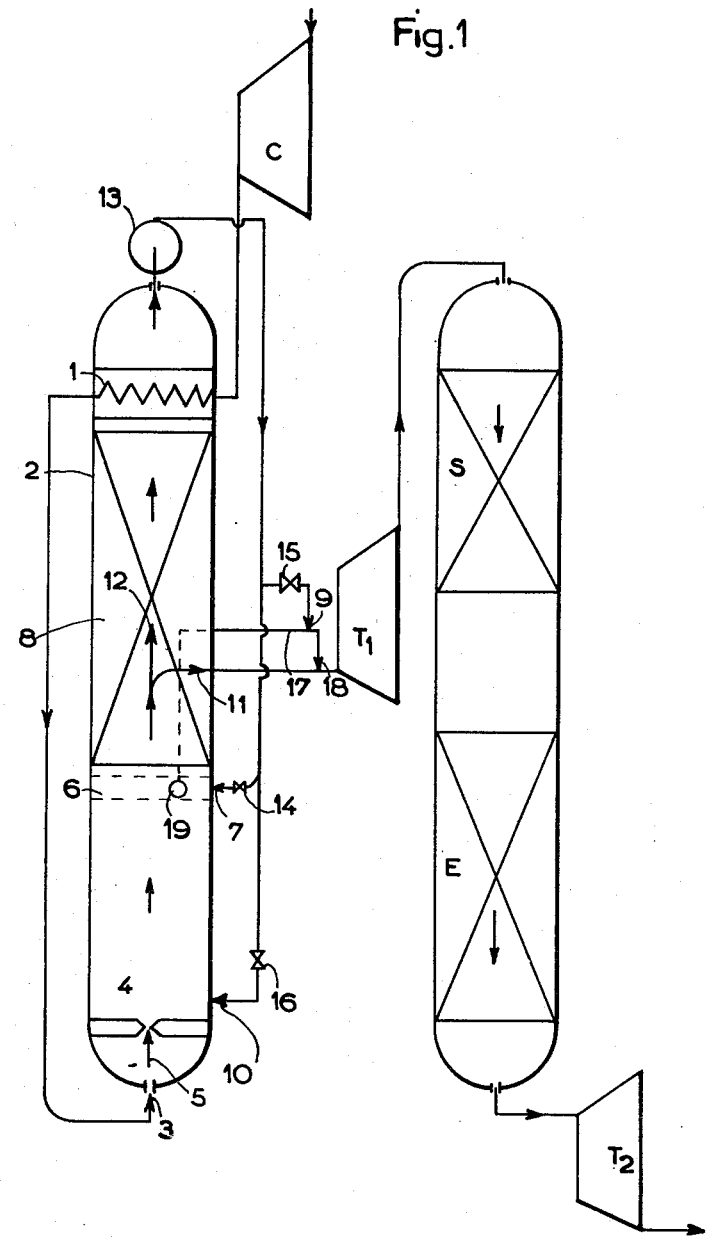

June 16, 1964  C. L. MACHEREY  3,137,134
COMBINED GAS-STEAM CYCLE INSTALLATIONS FOR
BOILERS INCORPORATING PRESSURISED FURNACES
Filed July 18, 1960  3 Sheets-Sheet 1

Inventor
CHARLES L. MACHEREY
By Holcombe, Wetherill & Brisebois
Attorneys

June 16, 1964  C. L. MACHEREY  3,137,134
COMBINED GAS-STEAM CYCLE INSTALLATIONS FOR
BOILERS INCORPORATING PRESSURISED FURNACES
Filed July 18, 1960  3 Sheets-Sheet 3

INVENTOR
C. L. Macherey
ATTORNEYS

United States Patent Office 3,137,134
Patented June 16, 1964

3,137,134
COMBINED GAS-STEAM CYCLE INSTALLATIONS FOR BOILERS INCORPORATING PRESSURISED FURNACES
Charles Louis Macherey, Belfort, France, assignor to Societe Generale de Constructions Electriques & Mecaniques (Alsthom), Paris, France, a French body corporate
Filed July 18, 1960, Ser. No. 43,554
Claims priority, application France July 16, 1959
2 Claims. (Cl. 60—39.18)

The present invention relates to combined gas-steam cycle installations for boilers incorporating pressured boilers, and has for an object improvements therein.

In boilers operating at very high pressures and temperatures, the vapouriser plays only a small part in the total absorption of heat because the specific heat of vapourisation drops as the pressure increases and because the heat of superheating is itself increased, irrespective of the increase of the saturation temperature with pressure. In boilers employing resuperheating, the vapouriser plays an even smaller part in the absorption of heat so that it is necessary, in order to protect the superheaters and the resuperheaters from heat, to place the entire vapouriser before them in the path of the gases, and even to employ supplementary cooling means ahead of the input to the superheater or the resuperheater, for example by recycling the gases which, by mixture with the main stream, restore the gases, which are very slightly cooled in the vapouriser, to a temperature compatible with good management of the superheater or the resuperheater.

A characteristic of these boilers operating at high pressures and temperatures is that, if for a given injection of fuel, the effectiveness of the exchange surfaces varies, the production of steam can vary very appreciably. Moreover, it is well known that it is difficult to calculate the heat exchange by radiation. The error which can be made, with high pressure boilers, in the evaluation of the temperature of the gases at the exit from the furnace, gives rise principally to a lack or an excess of vapourisation. The excess of vapourisation on the screens of the chamber can be corrected by various means, for example, by covering the vaporiser screens to a greater or lesser extent, but the lack of vapourisation is not easily corrected. One is thus led to provide an excess of effective vapourisation surfaces which are corrected according to the observations made in the starting up by available means, but incompletely, in order to provide the falling off of the various origins in the effectiveness of the vapouriser, when, for example, a layer of scale covers it along its length.

Further, the exchange surface area is necessarily above the limit below which the rate of superficial heat transfer, and consequently the thermal gradients in the tubes, would be dangerous. Independently from this doubt on the determination of areas of the radient surfaces, and of the question of deposits, it is often necessary to install systematically an excess of exchange surfaces in the combustion chambers, of which it is required to moderate the exchange power by suitable means. When this is the case, the installed excess of surface area for the protection of the plant place doubt on the determination of the surface areas and the variation of its effectiveness due to deposits.

The excess of surface, systematically accepted in order to limit the calorific load of the furnace to the maximum working, is then more sensitive to reduced working. It is necessary to arrange a control system, for the quantity of steam produced, the action of which control system is the more powerful the smaller the demand for steam.

This system can comprise an injector, in the neighbourhood of the feed to the furnace, for cold gases taken off the recycle circuit. Its application thus has for its consequence an increase of the superheating temperature, due to the eventual increase of the temperature and to the increase of the flow of the gases fed to the superheater. If the temperature of the gases is limited by recycling cold gases to the input of the superheater, the increase of the temperature of superheating is due solely to the increase of the flow of gas, but this is more important. It is thus established that in steam boilers operating at high pressures and temperatures, the control of the vapourisation and of the temperature of the steam are related under conditions which cannot be contradicted. If, for example, for a given injection of the fuel, the vapourisation is very high (low temperature of the gas at the input of the superheater or resuperheater, and excess flow of steam into the superheater or resuperheater), the temperature of the steam is normally very low: the control will tend at the same time to bring together the flow of steam and the temperature of the steam, for suitable values.

In the case of heat exchangers with pressurised furnaces arranged in the cycle of a gas turbine, certain particular conditions obtain amongst which the most important, from the point of view of power economy, is the feeding of the gas at as high a temperature as possible into the gas turbine (into the upstream turbine if the expansion of the gases is made in two stages). This temperature is, however, limited by considerations of the working of the plant, account being taken of the properties of the metals available at a given time in the development of the technique. With this development, the admissable temperature increases and the fractionisation of the expansion will present a disadvantage.

Thus, if a certain temperature of the gases at the input of the turbine is accepted as an upper limit of suitable temperatures, there is practical interest in seeing that this is not exceeded. It is thus necessary to arrange control means which maintain the temperature of the gases at the input of the turbine to the limiting value and prevent it exceeding the dangerous level.

The present invention has for a particular object, improvements which allow the temperature of the gases leaving the boilers to be controlled, the superheaters and resuperheaters to be protected, and the production and the temperature of the steam to be controlled.

In bringing the invention into effect, the temperature of the gases leaving the boilers is maintained at an upper limit by mixing these gases with cold recycled gases and combustion gases previously taken up into a zone of elevated temperature of the boilers. The control of the vapourisation and that of the superheating can, moreover, be carried out by injection of another fraction of recycled gases into the combustion chamber and in advance of the superheaters or resuperheaters.

The principal flow of recycled gases corresponds to the fraction necessary for limiting the temperature of the gases in front of the superheaters or resuperheaters. In cases where the control of the vapourisation is conducted by taking up a certain fraction of this flow, the total flow of recycling is not substantially affected, since the fraction taken up continues to play its part in the cooling of the fumes at the input of the superheater. The total recycling is important, at least in the actual state of the technique of metals, so as to be able to provide the intense cooling which is demanded. It should be remarked that the tendency of the temperature of the gases at the output of the boilers is to rise as the surfaces become dirty and that the two secondary recycling flows, at the output of the gases from the boilers and into the combustion chamber, vary in opposite directions.

When the output temperature of the gases is controlled at the selected limit and when the injection of air and of fuel is that provided for the desired vapourisation, an excess of superheating is a certain indication of a lack of vapourisation, if one assumes, as it is legitimate to do, that the low temperature superheat imposed on the gases at an intermediate pressure can be determined or controlled with a certain precision. For reheaters placed completely at high pressure, no restriction is made. Conversely a lack of superheating is a sign of more vapourisation than is desired.

It is advantageous to control the temperature of the gases at the output of the boilers, as this ensures the rigid linking between the control of the vapourisation and the control of the superheating or resuperheating. These two latter controls can and must be submitted to a single stimulus, for example, when it is possible, the steam flow. Naturally, the rigid linking produced does not only imply a tendency but also the arrival at the precise equilibrium values for each of the two parameters: steam flow and steam temperature, since the temperature of the gases at the input of the gas turbine has been fixed at the agreed value.

Therefore three pipe branches are provided on the piping for the recycling blower. The first branch serves for the injection of the gases at the input of the superheaters or resuperheaters, and is equipped with a control valve subjected to control by the temperature of the gases at the input of the superheaters or resuperheaters, or better by the maximum temperature of the metal of the superheaters or resuperheaters, as measured by thermoelectric couples. The second branch converges on the exit piping of the boiler gases, and a valve which is fitted thereto is controlled by the temperature of the gases in said piping, or by the maximum temperature of the metal of the turbines receiving the gases leaving the boilers, as measured by couples placed at convenient points on the metallic parts of this turbine or by any other means. The third branch is connected to the input of the combustion chamber and its control valve is subjected to control by the impulse obtained, for example, by measurement of the steam flow, or by comparison of the steam flow and the fuel flow. When measurement of the steam flow is impossible, the impulse is taken on the temperature of the superheated or resuperheated steam. The controls of the first and third injections are furthermore associated.

It is desirable to complete the protection of the superheaters and the resuperheaters with surface or water-injection de-superheaters which act in the case of accidents as temperature limiters.

The control of the fuel is effected by ordinary means under the impulse of the demand for steam and the air is controlled proportionally to the fuel. In the case where the fuel used is natural gas, with a high proportion of methane, it is very important, in case of extinction and subsequent re-ignitions causing explosion, that the air-fuel proportion be maintained as constant as possible.

The recycling gases are cooled in the high pressure part of the boiler, on the surfaces of the superheaters or the resuperheaters, or alternatively economisers, and finally, preferably, according to the invention, on the air reheaters, thus allowing the lower temperature of the recycled gases to be obtained. There results therefrom a flow which is smaller by weight and particularly by volume, and a greater facility of installation of the blowers.

The recycling blower or blowers may be driven by one or more electric motors. But this solution is difficult to apply because the motors must be located in atmospheric surroundings; passing the driving shafts through the envelopes and walls, where the discharge pressure of the compressor approximately applies, raises a problem of sealing which is difficult to solve. Furthermore, the shafts carrying helices or propellers must comprise return angles which are impossible to lubricate, and also have large overhanging parts. These difficulties can be removed by using, in accordance with the invention, compressed air itself as a driving fluid, produced, with the necessary slight excess pressure, by the main compressor. The compressed air injected into the envelope is expanded in one or more air turbines placed in the ambient high pressure air before the input of the air into the combustion chamber. The shaft of each turbine carries a spiral blower placed in the high pressure gas atmosphere. The shaft common to the turbine and to the blower crosses one or more partitions, between the air and gas compartments, but the difference of pressure between the air and the gases which respectively occupy these compartments is quite small and equal to the loss of air pressure in the air turbine, in the valves of the burners, and in the convection tubes. The problem of sealing of the passage of the shaft from one compartment to the other is consequently very easy to resolve, all the more since the leaks from the air compartment to the gas compartment are only very small. It is worth noting that, in the applications, the air temperature and the temperature of the gases in the turbo-blower for air are generally very close to each other and slightly elevated. The construction of the turbo-blower does not require the use of special steels and it is sufficient to cool the blocks supporting the shaft and the optional stops, by water circulation.

This system of blowing has other advantages. The energy consumed in the main compressor and provided by the gas turbine is very well used in the blower. Furthermore, this energy is recovered in the form of heat in the boiler and in general in the convection tubes. This latter condition, it is true, is realised with the systems at present used, with the difference that, in these present systems, the necessary energy is produced with very mediocre yield which characterises the transformation of heat into work.

Without having to separate for so many recycling circuits, it is advantageous to employ, not one, but several blowers, in such a manner as to have a better regard to the symmetrical distribution of the fluid currents in the convection tubes, and to distribute the flow of gases injected to the right places where it is important that they make a suitable mixture with the main stream.

It is also advantageous to arrange means for controlling the total flow of the recyling blower. The qualitative description which has been given could be taken as suggesting that the variations of the total flow were obtained by the automatic opening or closing of the various valves of the recycling circuits. But the disadvantage of high amplitude controls is removed if it is possible to adjust the speed of the blower as a function, for example, of the total flow of gas which it transmits, or of the discharge pressure, or as a function of any other parameter. The control of the speed as a function of the flow reduces the amplitude of opening of the valves, and, as a function of the pressure, it would be opposed, if there was need, to the interactions. Now, a similar device for the control of the blower speed is provided simply by arranging means allowing the diversion of a part of the fluid controlling the feed turbine of the blower. The impulse created by the variation of the chosen parameter, controls the opening or the closing of the shunt throttle of the air turbine, according to whether the speed of the blower requires to be decreased or increased. The recycling gas flow being a minimum when the effectiveness of the vapourising surfaces is a minimum, that is to say exactly sufficient for the production of the steam required. It is sufficient that the complete opening of the throttle is provided for this position. In the converse case: maximum effectiveness of vapourising surfaces, the throttle is closed, if this is necessary, and all the air driven by the main compressor passes into the turbine. When the total weight of air is slightly above the weight of gas made to circulate, the pressure fall in the air turbine is slightly below the differential pressure which the blower is capable of ensuring.

It is not possible to arrange butterfly control valves in the tubes through which the gases pass at very high temperature intended to limit in an inferior manner the temperature of the gases delivered by the boilers. In accordance with the invention, control members are not arranged in these tubes, but leads thereto feed tubes for cold recycled gases intended for controlling the temperature of the gases delivered by the boilers after mixing with said very high temperature gases. The pressure of the recycled gases being above that of the warm control gases, it is sufficient to place shutter devices at the point where the recycled gases arrive. The mixture of the warm gases and the cold control gases is effected without alteration of the flow of the warm gases, or in such a way that the flow of the warm gases varies in an inverse direction to the flow of the cold gases.

Reference will now be made to the accompanying drawings which show, by way of example, one particular embodiment of apparatus for putting the invention into practice.

Figure 2:
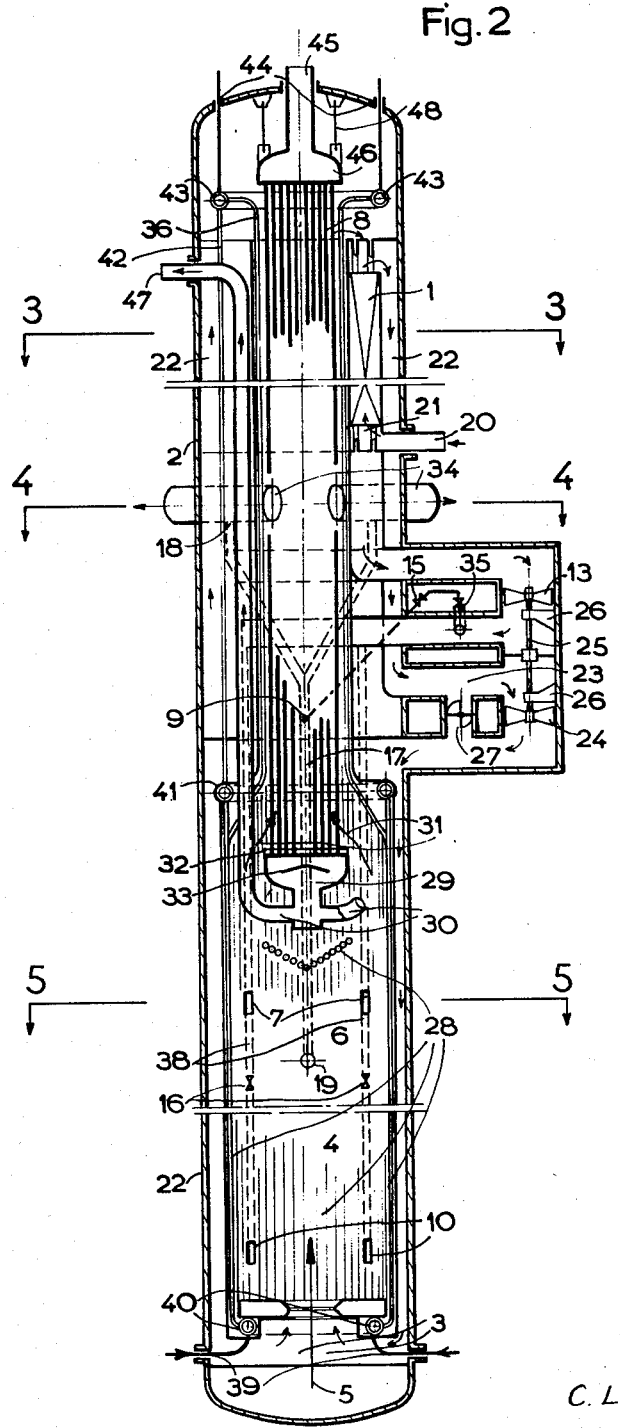
Figure 3:
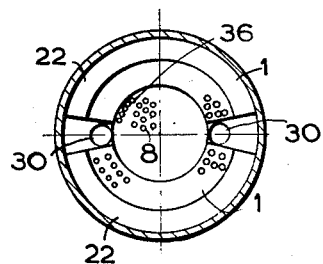
Figure 4:
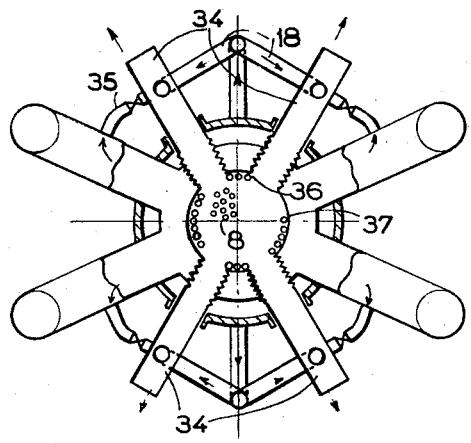
Figure 5:
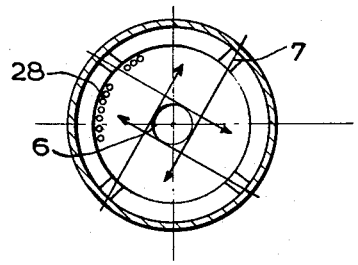

The arrangements of the embodiment which will now be described by way of example, must be considered as forming part of the invention, it being understood that any equivalent arrangements could also be equally used without departing from the scope of the invention. In the drawings:

FIGURE 1 shows a scheme for the operation of an installation conforming to the invention, FIGURE 2 shows a section through a constructive arrangement of a high pressure envelope containing a vapouriser, a resuperheater and an air reheater, FIGURE 3 shows a section along the line 3—3 of FIGURE 2, through the resuperheater and the air reheater, FIGURE 4 shows a section along the line 4—4 of FIGURE 2, through the resuperheater and the piping for the exit of the gas from the envelope, and FIGURE 5 shows a section along the line 5—5 of FIGURE 2, through the combustion chamber and the injection nozzles for the recycled gases.

Envelopes containing a high temperature superheater instead of a resuperheater have not been shown in the drawings, since the high temperature superheater and the resuperheater have a similar principle and only differ in details which have no bearing on the characteristics of the invention. The same comment applies to envelopes containing low temperature superheaters and economisers.

FIGURE 1 shows, schematically, the application of the invention to a pressure furnace boiler with gas turbine, the expansion being fractionated in two pressure stages. The compressor C induces combustion-supporting air from the atmosphere and feeds it into an air reheater 1 contained in the envelope 2; the air thus reheated is injected at 3 into the combustion chamber 4 which receives, in the direction of the arrow 5, an injection of fuel proportional to the demand for steam. The combustion gases are cooled by radiation on the vapouriser screens lining the walls of this chamber 4 and optionally on the vapouriser convection tubes, not shown, placed at the exit of the combustion chamber. The gases at the exit of the vapouriser are cooled in a chamber 6 by low temperature gases admitted at 7 thereinto. They then enter into the convection tube 8 which constitutes for example a steam resuperheater. When the gases have been cooled in the first part of the tube 8 to a temperature compatible with the good management of the gas turbine T1, they divide into two streams directed respectively along the arrows 11 and 12. The current directed along the arrow 11 leaves the envelope and passes into the gas turbine T1; the current directed along the arrow 12 is cooled in the second part of the resuperheater 8, then in the air reheater 1. A fraction of these cooled gases is recycled at 7 for the protection of the resuperheater. A second fraction is recycled at 9 for the protection of the gas turbine T1, and a third fraction is recycled at 10 for the control of the steam production of the vapouriser and correlatively the superheating temperature. The blower 13 ensures the flow of the recycled gas stream. The flow of recycled gases at 7, 9 and 10 is controlled by valves 14, 15, 16 respectively. The valve 14 is controlled by the impulse of the temperature of the mixture of the gases in the chamber 6 or of the maximum temperature of the metal of the tubes of the resuperheater; the valve 15 is controlled by the impulse of the temperature of the gases at the input of the gas turbine T1, or of the maximum temperature of the metal of that machine; the valve 16 is controlled, for example, by the impulse of the steam flow, or of the comparison of this flow with the flow of combustion air, itself proportional to the flow of fuel. In the case where the vapouriser is distributed between several envelopes, the vaporiser sections feed in parallel to a common reservoir and the direct measurement of the quantity of steam produced in each of the envelopes is difficult. But the impulse controlling the valve 16 could, if desired, be taken on the temperature of the resuperheated steam, being given reciprocally as the control of the resuperheating assures the control of the vapourisation.

A pipe 17 injects the warm gases taken off at 19 in the chamber 6 into a pipe leading the fumes along the direction of arrow 11 into the gas turbine T1, at 18. The temperature of the gases taken off at 19 is too high for the flow of these gases to be controlled. But the flow of recycled gases injected at 9 into the pipe 17 is, on the contrary, controllable by the valve 15, and, when these recycled gases are injected at 9, they mix with them or they drive the hot gases coming from 19 in such a way as to realise a suitable temperature.

The gases which leave the turbine T1 are cooled in a low temperature superheater S, then in an economiser E and are finally released to the atmosphere in a gas turbine T2.

The description which follows relates to the case where the convection tube 8 is a resuperheater. The description would be similar if the convection tube 8 were a superheater with some different details outside the scope of the invention. On the other hand, the reservoir of the boiler, the piping of the junction, all of which are of current techniques, are not shown. The boiler has been assumed to be of natural circulation, but could be of forced circulation or of cross-forced circulation, without the character of the invention being modified.

In FIGURE 2, the pipe 20 serves for the input of the air coming from the main compressor, into the envelope 2. This air is distributed in the annular space 21 which surrounds the resuperheater 8 at the exterior of the downstream end of the smoke tubes of the air reheater 1, which reheater occupies, as can be seen from FIGURE 3, two sectors of this annular space. The air is reheated in the air reheater 1 by passing from the bottom to the top about the smoke tubes. At the output of the apparatus, where it has a temperature in the region of the temperature of saturation at the pressure of the boiler, it undergoes a change of direction, and it passes from top to the bottom in the annular space 22, in contact with the envelope 2, which is put into temperature equilibrium with it. At a certain level, it changes direction and enters at 23 into the air turbine 24 serving as the driving means for the blower 13. The turbine 24 and the blower 13 are mounted on a common shaft 25 supported by the cooled blocks 26. The shaft passes through the partition which separates the air and gas regions. Although the difference of pressure on both sides of these two partitions is small, and the small leaks are unimportant, it is permissible to have recourse to ordinary sealing devices which, being conventional, are not shown. With a view to controlling the flow of recycled gases, a turbine shunt has been provided, automatically controllable by means of the throttle 27, placed under the control of the flow of recycled gases, or under that of the pressure of the gases down-stream from the recycling blower. It has been judged opportune to place the turbo-blowers in the tubes exterior to the envelope, for reasons of accessibility. They could be placed in the envelope itself without the characteristics of the invention being modified. In the adopted arrangement, a damaged turbo-blower can be extracted from its cover, and the cover can be isolated in a sealed manner by any suitable means (not shown). The apparatus continues to function during the repairing of the damaged blower, with blowers in good condition. The number of blower groups shown is four, but it can be different. At the exit of the air turbine 24 and, if desired, of the shunt, the air undergoes a change of direction and is directed by passing through the lower part of the annular space 22, to the point of injection 3 in the valves (not shown) of the burner. The injection of the fuel takes place at 5 into the rod of the burner which also is not shown. The combustion of the fuel with the combustion-supporting air takes place at the commencement of the combustion chamber 4. The fumes produced by this combustion, eventually mixed with the gases recycled at 10, rise in the combustion chamber 4, giving heat to the walls by radiation. When they arrive at the levels of the injections 7 of the chamber 6, they are cooled by mixture with the gases, recycled at 7, then continue their rise by turning around those of the protector screens 28 shown as having the shape of a dihedron. It will be understood that said screens may have other shapes. These screens protect the collector 29 of appropriate form of the resuperheater and the escape pipe 30 of this resuperheater, against the direct radiation from the furnace and convection of the gases. In order to facilitate the reading of this small scale drawing, the dihedral screen has not been shown in its true position. In order to have this true position, the dihedron must be turned one quarter of a revolution about the vertical axis of the envelope 2. It is thus seen that the screen protects the collector 29 and the pipe 30 from radiation, and deviates the gases in such a manner that they do not touch the pipe 30. The gases enter at 31 into the resuperheater tube 8. A protection device, shown schematically at 32, protects the steam inputs at the collector which may have the shape shown at 29 or any other desired shape. Appropriate baffles, shown schematically at 33, make the current of steam resuperheated by assuring the effective cooling of the collector 29. These arrangements are also schematic since the necessity of free individual expansion of the tubes leads to the adoption of escape capacities of branched form and of which the technique is not characteristic of the invention. The gases rise in the resuperheater up to the level of the pipe 34, where there is effected the separation of the fraction sent to the upstream gas turbine, optionally cooled by the gases crossing the control valve 15 placed on the pipe 35 or reheated by the gases coming from 19.

The junction of the exit pipe 34 at the resuperheating compartment 8 can be seen better in FIGURE 4. At the level of the exits 34, the tubes 36 are cut away to allow passage of the gas. The pipes 34 are coupled to the envelope 2 by the known arrangement like the fingers of a glove which is necessitated by the difference of temperature between the envelope 2 and the pipes 34. Finally, a thin bellows tube, in stainless steel, is welded on the rim of the finger of the glove, and at its other end on the circumference of a perforation cut in the thin sheet 37 which limits the compartment of the air reheater. The fraction which is not sent to the gas turbine continues its rise in the superheater 8, changes direction at the upper part, and passes into the tubes of the air reheater 1. The gases constituting this fraction pass from the top to the bottom of the air reheater 1, are induced by the blower 13 which drives them into the channels 38 and 35, conducting them to the injection orifices 7 in the chamber 6, to the orifices 10 of the combustion chamber, and to the orifices 9 of the pipe 17. FIGURE 5 shows tangential injections, but any other means of mixing can be used. The power of the blower 13 must thus overcome the losses of pressure of the gases in the resuperheater, in the air reheater, in the pipes and in the injection devices located at 9, 7 and 10.

The circulation water delivered by the return tubes (not shown) comes from the reservoir of the boiler, passes at 39 into the envelope 2 and arrives at the toric collector 40 for the feed of the screens 28. The water rises, being vaporised in the screens 28, some of the tubes of which are connected to the collector 41. The emulsion arriving at the collector 41 is released through the tubes 42 into the collector 43. Those of the tubes 28 which do not join up to the collector 41, are conically deformed into a shape forming the joining envelope 36 of the resuperheater. The tubes overlap the screen 28 and form the screen 36 close to the collector 43, connected to the reservoir through the exit tubes 44. The air which circulates in the annular space 22 adjacent to the envelope 2 being essentially at the saturation temperature corresponding to the pressure in the boiler, the vapouriser tubes 28 and 36 and the escape 42 expand substantially like the envelope 2, in such a way that the problems of differential expansion of the envelope and of the vapouriser are simplified. The collector 43 is supported by the exit tubes 44, and the vapouriser, suspended by the collector 43, expands freely downwards, without significant displacement with respect to the envelope 2.

The steam to the resuperheater penetrates through the tube 45 into the distributor 46, of appropriate form, of the resuperheater. The steam passes to the interior of the tubes of the resuperheater, 8, arrives at the collector 29 where, as a result of the baffling indicated schematically at 33, it turns about the walls of the collector 29 in such a way as to protect them against an excess of temperature. The steam is then released into the pipes 30, and is then released at 47 to be led to the second stage of the steam turbine.

The envelope 2 is supported by a skirt, not shown, or by any equivalent device.

The resuperheater is suspended at the upper end of the envelope 2 by a device shown schematically at 48. As the steam arrives at the resuperheater at a temperature very close to the temperature of the envelope, no problem of thermal constraint is posed with reference to the traversal of the envelope by the pipe 45. The expansion of this pipework between the entry into the envelope and the distributor 46 is substantially the same as the expansion of the suspension device. The pipes 30, which rise again into the channels, visible in FIGURE 3, arranged between the two half-air reheaters 1 and the two annular half-spaces 22, meet at a chosen point on the envelope in such a manner that the expansion of the channels 30 is equal to the expansion of the resuperheater 8 and of its suspension. The arrangements adopted consequently make possible the free vertical expansion, towards the base, of the suspended resuperheater.

I claim:

1. A combined gas-vapour-cycle installation having a pressure boiler located above said installation and a gas turbine located below said installation, said boiler comprising a combustion chamber, a compressor for supplying said combustion chamber with compressed air, a first and a second series of heat-exchangers, passages to convey the combustion gases leaving said combustion chamber to said first series of heat-exchangers ducts to collect the major portion of the combustion gases at the outlet of said first series of heat-exchangers and to convey them to said gas turbine, said major portion of the combustion gases constituting a main supply flow to the said gas turbine, passages to convey the other portion of the combustion gases, and arranged at the outlet of said first series of heat-exchangers, to second series of heat-exchangers, where they cool, a blower provided inside said boiler to compress the cool combustion gases leaving said second series of heat-exchangers, said blower comprising a fan and an auxiliary turbine mounted on a common shaft and hermetic seals through which said shaft passes and which separate said fan from said auxiliary turbine, said auxiliary turbine being driven by the compressed air provided by said compressor, ducts to collect a flow of cool combustion gases at the outlet of said blower, ducts to collect a flow of hot combustion gases at a point along the passages through which said hot combustion gases pass, in said first series of heat-exchangers, and means for mixing said flow of cool combustion gases and said flow of hot combustion gases with said main supply flow to said gas turbine.

2. A combined gas-vapour-cycle installation having a pressure boiler located above said installation and a gas turbine located below said installation, said boiler comprising a combustion chamber, a compressor for supplying said combustion chamber with compressed air, a first and a second series of heat-exchangers, passages to convey the combustion gases leaving said combustion chamber to said first series of heat-exchangers, ducts to collect the major portion of the combustion gases at the outlet of said first series of heat-exchangers and to convey them to said gas turbine, said major portion of the combustion gases constituting a main supply flow to the said gas turbine, passages to convey the other portion of the combustion gases, and arranged at the outlet of said first series of heat-exchangers, to second series of heat-exchangers, where they cool, a blower provided inside said boiler to compress the cool combustion gases leaving said second series of heat-exchangers, said blower comprising a fan and an auxiliary turbine mounted on a common shaft and hermetic seals through which said shaft passes and which separate said fan from said auxiliary turbine, said auxiliary turbine being driven by the compressed air provided by said compressor, ducts to collect a flow of cool combustion gases at the outlet of said blower, and means for mixing said flow of cool combustion gases with said main supply flow to said gas turbine.

References Cited in the file of this patent

UNITED STATES PATENTS

| | | |
|---|---|---|
| 1,822,081 | Coppus | Sept. 8, 1931 |
| 2,110,422 | Norguet | Mar. 8, 1938 |
| 2,663,144 | Nordstrom | Dec. 22, 1953 |
| 2,717,491 | Barr | Sept. 13, 1955 |
| 2,730,971 | Birkner | Jan. 17, 1956 |
| 2,795,213 | Cooper | June 11, 1957 |
| 2,859,954 | Grey | Nov. 11, 1958 |
| 2,897,797 | Koch | Aug. 4, 1959 |
| 2,952,975 | Braddy | Sept. 20, 1960 |

FOREIGN PATENTS

| | | |
|---|---|---|
| 655,623 | Germany | Jan. 19, 1938 |
| 953,153 | France | May 16, 1949 |
| 791,452 | Great Britain | Mar. 5, 1958 |